United States Patent
Mineda

(10) Patent No.: US 10,255,119 B2
(45) Date of Patent: Apr. 9, 2019

(54) PARALLELIZATION METHOD, PARALLELIZATION TOOL AND VEHICLE-MOUNTED DEVICE

(71) Applicant: DENSO CORPORATION, Kariya, Aichi-pref. (JP)

(72) Inventor: Kenichi Mineda, Kariya (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 15/279,600

(22) Filed: Sep. 29, 2016

(65) Prior Publication Data
US 2017/0109216 A1    Apr. 20, 2017

(30) Foreign Application Priority Data

Oct. 20, 2015    (JP) .................. 2015-206200

(51) Int. Cl.
| | |
|---|---|
| *G06F 9/46* | (2006.01) |
| *G06F 9/52* | (2006.01) |
| *G06F 9/48* | (2006.01) |
| *G06F 8/41* | (2018.01) |

(52) U.S. Cl.
CPC ............... *G06F 9/52* (2013.01); *G06F 8/451* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2007/0283358 | A1* | 12/2007 | Kasahara | G06F 9/5044 718/104 |
| 2010/0153954 | A1* | 6/2010 | Morrow | G06F 9/5094 718/102 |
| 2014/0237477 | A1* | 8/2014 | Cadambi | G06F 9/4881 718/103 |
| 2014/0372995 | A1 | 12/2014 | Mori et al. | |
| 2016/0085572 | A1* | 3/2016 | Hotra | G06F 9/45558 718/1 |

OTHER PUBLICATIONS

Greenwald et al., A Conditional Scheduling Approach to Designing Real-Time System, American Association for Artificial Intelligence, 1998.
Peng et al., Timing Analysis and Conditional Scheduling in a Real-Time System Design Environment, IEEE, 1994, pp. 214-219.

* cited by examiner

*Primary Examiner* — Tammy E Lee
(74) *Attorney, Agent, or Firm* — Posz Law Group, PLC

(57) ABSTRACT

A parallelization method for generating a parallel program for a multicore microcomputer from multiple processes in a single program for a single-core microcomputer is provided. In the single program, there are multiple types of the processes and a combination of the types of processes to be executed varies according to condition. The parallelization method includes extracting processing patterns respectively representing the combinations of types in the conditions from the single program and allocating the processes to the cores for each of the extracted processing patterns to generate the parallel program.

15 Claims, 6 Drawing Sheets

FIG. 3

```
Task_1ms()
{
    f_1ms_A();
    f_1ms_B();

if ((count % 2) == 1)
        f_2ms_A();
    if ((count % 2) == 1)
        f_2ms_B();

if ((count % 4) == 0)
        f_4ms_A();
    if ((count % 4) == 0)
        f_4ms_B();

if ((count % 8) == 2)
        f_8ms_A();
    if ((count % 8) == 2)
        f_8ms_B();

count++;
}
```

FIG. 4

| PROC PATTERN (COUNT VALUE) | EACH CYCLE PROC | | | | |
|---|---|---|---|---|---|
| | 1 ms CYCLE PROC | 2 ms CYCLE PROC | 4 ms CYCLE PROC | 8 ms CYCLE PROC | |
| 0 | ○ | | ○ | | ~Pt0 |
| 1 | ○ | ○ | | | ~Pt1 |
| 2 | ○ | | | ○ | ~Pt2 |
| 3 | ○ | ○ | | | ~Pt3 |
| 4 | ○ | | ○ | | ~Pt4 |
| 5 | ○ | ○ | | | ~Pt5 |
| 6 | ○ | | | | ~Pt6 |
| 7 | ○ | ○ | | | ~Pt7 |

PARALLELIZATION METHOD, PARALLELIZATION TOOL AND VEHICLE-MOUNTED DEVICE

CROSS REFERENCE TO RELATED APPLICATION

This application is based on Japanese Patent Application No. 2015-206200 filed on Oct. 20, 2016, disclosure of which is incorporated herein by reference.

TECHNICAL FIELD

The present disclosure relates to a parallelization method and a parallelization tool for generating a parallel program for a multicore microcomputer from a program for a single-core microcomputer, and a vehicle-mounted device that implements the parallel program generated by the parallelization method.

BACKGROUND

Up to now, as an example of the parallelization method for generating the parallel program for the multicore microcomputer from the program for the single-core microcomputer, there is a parallelization compile method disclosed in Patent Literature 1.

In the parallelization compile method, after a sequential program for an embedded system to be executed by a single processor system has been divided into multiple macro tasks (hereinafter referred to as "MTs"), the MTs having a control dependency are conflated into one MT. Thereafter, in the paralielization compile method, parallelizable MTs are extracted on the basis of data dependency, and static scheduling is performed to generate a parallel program.

Patent Literature 1: JP2015-1807A corresponding to US2014372995(A1) and DE102014211047(A1)

The following describes related art which does not necessarily constitute prior art. In some single programs, multiple types of MTs are provided, and a combination of MT types to be executed varies according to condition. An example of such a single program is as follows. An MT of a first type and an MT of a third type are executed under one condition, and the MT of the first type and an MT of a second type are executed under another condition. Specifically, the single program includes multiple processing patterns which are different in the combination of MT types, and the MTs of the types included in the processing pattern corresponding to the condition are executed. In this single program, the MTs of all types are not included in each processing pattern.

When there is conditional branch processing in the single program, the method disclosed in Patent Literature 1 cannot recognize how branching will occur during actual program execution. Hence, in the parallel program generated in Patent Literature 1, an MT that is not actually executed under a certain condition when the cores of the multicore microcomputer execute the MTs may be allocated to the core. For that reason, the core does not execute the allocated MT in some cases and the method disclosed in Patent Literature 1 generates such parallel programs that multicore microcomputer efficiency is reduced.

SUMMARY

In view of the foregoing difficulties, it is an object of the present disclosure to provide a parallelization method, a parallelization tool capable of creating a parallel program that can suppress a reduction in multicore microcomputer efficiency, and a vehicle-mounted device capable of suppressing the reduction in the multicore microcomputer efficiency.

In a first aspect of the present disclosure, a parallelization method for generating a parallel program parallelized for a multicore microcomputer having a plurality of cores from a plurality of processes in a single program for a single-core microcomputer having one core is provided. In the single program, there are multiple types of the processes and a combination of the types of processes to be executed varies according to condition and a plurality of the conditions are provided. The parallelization method comprises: an extraction procedure of extracting processing patterns from the single program, wherein the processing patterns, respectively, are the combinations of the types in the plurality of conditions; and a generation procedure of, for each of the extracted processing patterns, allocating the processes to the cores to generate the parallel program.

As described above, the parallelization method generates the parallel program from the single program in which there are multiple types of the processes and in which a combination of the types of processes to be executed varies according to condition. From the single program, the parallelization method extracts processing patterns representing the combinations of the types under the multiple conditions, respectively. As a result, the processes to be executed under each condition are recognized. Further, for each of the extracted processing patterns, the parallelization method allocates the processes to the cores to generate the parallel program. For that reason, processes that are not actually executed under a certain condition during multicore microcomputer execution of the parallel program are restrained from being allocated to the cores. Therefore, the paralielization method can create the parallel program that can suppress a reduction in multicore microcomputer efficiency.

In a second aspect of the present disclosure, a parallelization tool including a computer for generating a parallel program parallelized for a multicore microcomputer having a plurality of cores from a plurality of processes in a single program for a single-core microcomputer having one core is provided, In the single program, there are multiple types of the processes and a combination of the types of processes to be executed varies according to condition and a plurality of the conditions are provided. The parallelization tool comprises: an extraction unit that extracts processing patterns from the single program, wherein the processing patterns, respectively, are the combinations of the types of processes in the conditions; and a generation unit that, for each of the extracted processing patterns, allocates the processes to the cores to generate the parallel program.

This parallelization tool can also generate the parallel program capable of suppressing the reduction in the multicore microcomputer efficiency.

In a third aspect of the present disclosure, a vehicle-mounted device is provided which comprises: a multicore microcomputer having a plurality of cores and a parallel program parallelized for the multicore microcomputer from a plurality of processes in a single program for a single-core microcomputer having one core. In the single program, there are multiple types of the processes and a combination of the types of processes to be executed varies according to condition and a plurality of the conditions is provided. The parallel program is generated such that processing patterns, which respectively are the combinations of the types in the conditions, are extracted from the single program, and the processes are allocated to the cores for each of the extracted processing patterns. The cores execute the processes allocated to thereto.

As described above, the parallel program is generated so as to suppress a reduction in the multicore microcomputer efficiency and the multiple cores execute the processes allocated to the respective cores. Hence, the reduction in the multicore microcomputer efficiency can be suppressed.

BRIEF DESCRIPTION OF DRAWINGS

The above-described object and other objects, features and advantages of the present disclosure will become more apparent from the following detailed description made with reference to the attached drawings. In the drawings.

FIG. 3 is a diagram illustrating a source code showing a schematic configuration of a single program according to the embodiment.

FIG. 4 is a diagram illustrating processing patterns according to the embodiment.

DETAILED DESCRIPTION

Figure 1:
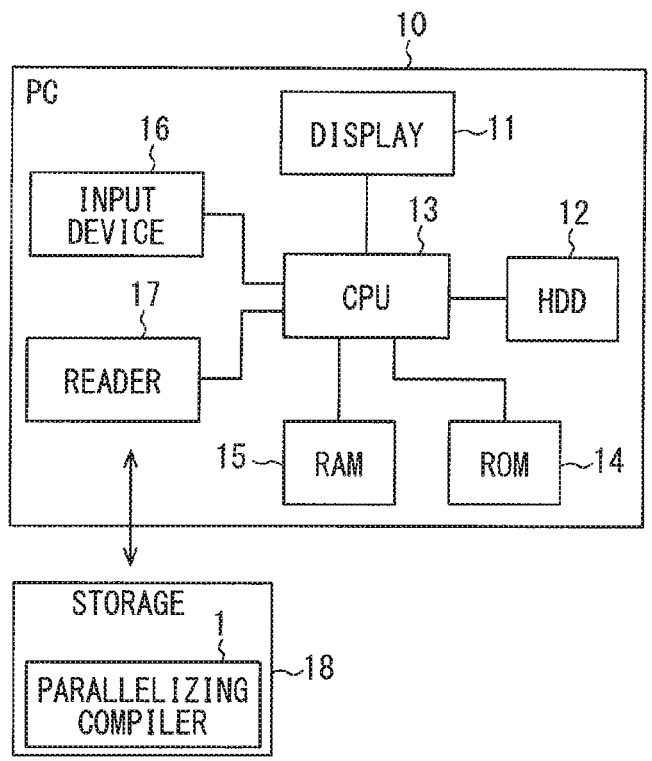
FIG. 1 is a block diagram illustrating a schematic configuration of a computer according to a first embodiment.

Hereinafter, an embodiment will be described with reference to the drawings. The present embodiment is directed to an example of generating a parallel program 21a1 parallelized for a multicore microcomputer 21 having a first core 21c and a second core 21d, from multiple processes in a single program for a single-core microcomputer having one core. The processes can be also called "processing blocks" or "macro tasks". The multicore microcomputer can be also called "multicore processor".

One background to generate the parallel program 21a1 from the single program is that the multicore processor 21 becomes mainstream from the viewpoints of an increase in heat generation amount, an increase in power consumption of the microcomputer, a limitation problem of a clock frequency and the like. The multicore processor 21 needs to be applied even to a field of the vehicle-mounted device. The parallel program 21a1 is required to make the process executable with high reliability and at high speed while suppressing a development period and development costs of software.

In generating the parallel program 21a1, a dependency of the multiple processes in the single program is analyzed and scheduling is performed to allocate the multiple processes to different cores 21c and 21d of the multicore processor 21. In this regard, refer to Patent Literature 1, which is incorporated herein by reference.

In the present embodiment, a source code illustrated in FIG. 3 is employed as an example of the single program. The single program includes multiple types of processes. A combination of types of executed processes varies according to condition. Multiple conditions are provided. In more detail, the single program includes the processes of multiple execution cycles as the processes of multiple types. Specifically, the single program includes a process having a first execution cycle which is a shortest cycle, and further includes processes having execution cycles each of which is an integer multiple of the first execution cycle. In other words, the single program includes a configuration of performing frequency division to processes within a task. By the frequency division, the process that is acceptable even when its execution cycle is long is executed in a thinned out manner such as once every two times or twice every three times. The present embodiment employs an example in which the first execution cycle is 1 ms, and the execution cycles of the integer multiples are 2 ms, 4 ms, and 8 ms.

In addition, the single program is a program for the single-core microcomputer configured to acquire count values. The combination of types of processes to be executed varies according to the count value. The count values constitute the multiple conditions. Specifically, the single program is configured to be branched to the combination that corresponds to the count value. In the single program, branching directions of the frequency division are regular and the processing amount varies according to the branching direction.

As illustrated in FIG. 4, the present embodiment employs the single program in which execution cycles in count values 0 to 7 are different. The single program includes a first processing pattern Pt0 to an eighth processing pattern Pt7 as the multiple combinations.

In the count value 0, the process of 1 ms cycle and the process of 4 ms cycle are executed. Hence, the first processing pattern Pt0 includes the process of 1 ms cycle and the process of 4 ms cycle to be executed in the count value 0. In the count value 1, the process of 1 ms cycle and the process of 2 ms cycle are executed. Hence, the second processing pattern Pt1 includes the process of 1 ms cycle and the process of 2 ms cycle to be executed in the count value 1.

In the count value 2, the process of 1 ms cycle and the process of 8 ms cycle are executed. Hence, the third processing pattern Pt2 includes the process of 1 ms cycle and the process of 8 ms cycle to be executed in the count value 2. In the count value 3, the process of 1 ms cycle and the process of 2 ms cycle are executed. Hence, the fourth processing pattern Pt3 includes the process of 1 ms cycle and the process of 2 ms cycle to be executed in the count value 3.

In the count value 4, the process of 1 ms cycle and the process of 4 ms cycle are executed. Hence, the fifth processing pattern Pt4 includes the process of 1 ms cycle and the process of 4 ms cycle to be executed in the count value 4. In the count value 5, the process of 1 ms cycle and the process of 2 ms cycle are executed. Hence, the sixth processing pattern Pt5 includes the process of 1 ms cycle and the process of 2 ms cycle to be executed in the count value 5.

In the count value 6, the process of 1 ms cycle is executed. Hence, the seventh processing pattern Pt6 includes the process of 1 ms cycle to be executed in the count value 6. In the count value 7, the process of 1 ms cycle and the process of 2 ms cycle are executed. Hence, the eighth processing pattern Pt7 includes the process of 1 ms cycle and the process of 2 ms cycle to be executed in the count value 7.

The multiple processes include processes having a dependency on each other. The dependency represents, for example, a relationship in which one process refers to data updated by another process that has been executed earlier than the one process. Specifically, the multiple processes include a preceding process to be previously executed in the execution order in the single program, and a following process to be executed after the preceding process has been executed. The following process is a process affected by the preceding process, and uses data whose contents are likely to be updated in the preceding process.

A configuration of the computer 10 will be described with reference to FIG. 1. The computer 10 corresponds to a parallelization tool that executes a parallelization method and generates the parallel program 21a1. The computer 10 includes a display 11, an HDD 12, a CPU 13, a ROM 14, a RAM 15, an input device 16, and a reading unit 17. The computer 10 can read storage contents stored in a storage medium 18. An automatic parallelizing compiler 1 is stored in the storage medium 18. The computer 10 has various functions which will be described with reference to FIG. 5 later.

The HDD is an abbreviation of a hard disk drive. The CPU is an abbreviation of a central processing unit. The ROM is an abbreviation of a read only memory. The RAM is an abbreviation of a random access memory. For the configurations of the computer 10 and the storage medium 18, refer to a personal computer 100 and a storage medium 180 disclosed in Patent Literature 1.

The automatic parallelizing compiler 1 includes procedures for generating the parallel program 21a1. Hence, the automatic parallelizing compiler 1 corresponds to a parallelization method. In other words, the automatic parallelizing compiler 1 is a program including the parallelization method. The automatic parallelizing compiler 1 includes an extraction procedure and a coupling procedure in addition to the procedures disclosed in Patent Literature 1. Further, the automatic parallelizing compiler 1 is different from that disclosed in Patent Literature 1 in that the parallel program 21a1 is generated for each of the processing patterns Pt0 to Pt7. The extraction procedure and the coupling procedure will be described later.

Figure 2:
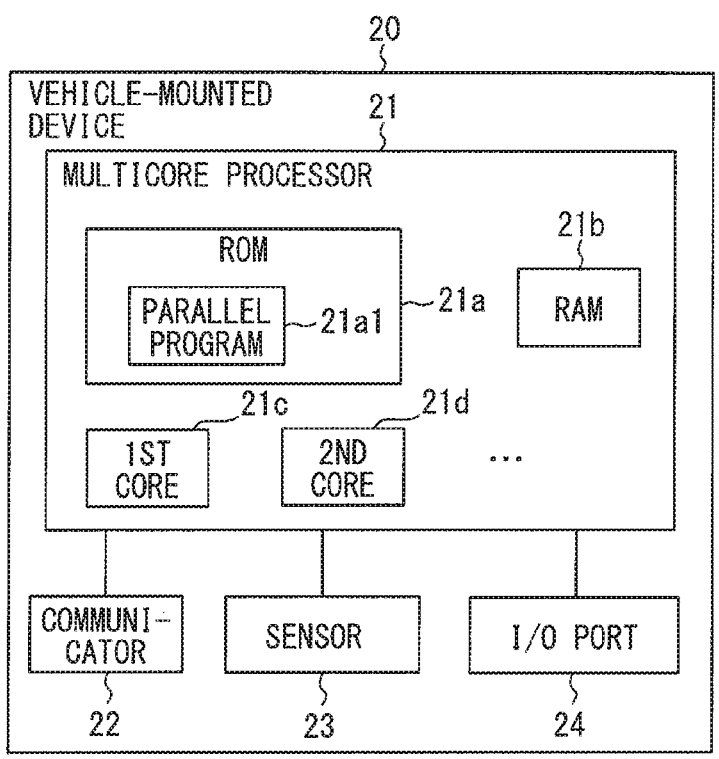
FIG. 2 is a block diagram illustrating a schematic configuration of a vehicle-mounted device according to the first embodiment.

Next, a configuration of the vehicle-mounted device 20 will be described. As illustrated in FIG. 2, the vehicle-mounted device 20 includes the multicore processor 21, a communication unit 22, a sensor unit 23, and an input/output port 24. The multicore processor 21 includes a ROM 21a, a RAM 21b, the first core 21c, and the second core 21d. The vehicle-mounted device 20 can be applied to an engine control device or a hybrid control device mounted in an automobile. In this example, the vehicle-mounted device 20 is applied to the engine control device. In that case, the parallel program 21a1 can be regarded as an automobile control program such as an engine control. However, the parallel program 21a1 is not limited to the above. The cores can be also called "processor elements PE". Hence, PE0 in the parallel program 21a1 which will be described later indicates the first core 21c. On the other hand, PEI indicates the second core 21d.

For the RAM 21b, the communication unit 22, the sensor unit 23, and the input/output port 24, refer to a RAM 420, a communication unit 430, a sensor unit 450, and an input/output port 460 disclosed in Patent Literature 1.

The parallel program 21a1 generated with the aid of the automatic parallelizing compiler 1 is stored in the ROM 21a. The first core 21c and the second core 21d execute the parallel program 21a1 to perform an engine control. The first core 21c and the second core 21d are configured to acquire the count value of a counter not shown.

Next, the processing operation when the computer 10 executes the automatic parallelizing compiler 1 will be described with reference to FIGS. 5 and 6. The computer 10 executes the automatic parallelizing compiler 1 to generate the parallel program 21a1.

Figure 5:
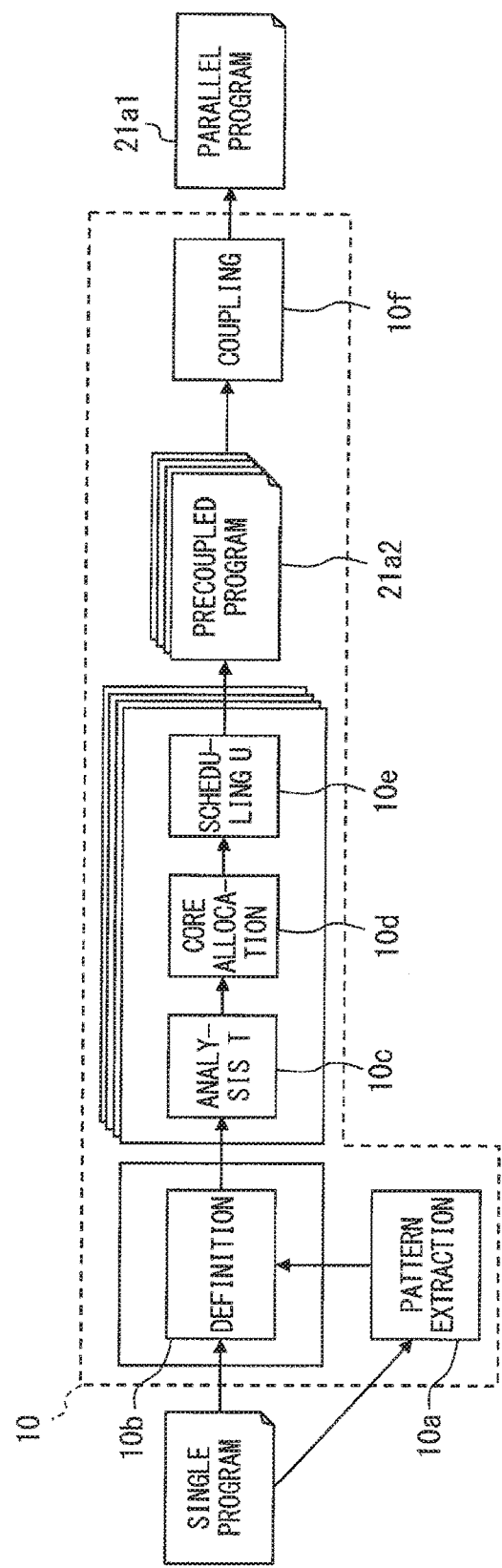
FIG. 5 is a block diagram illustrating a function of the computer according to the embodiment.
Figure 6:
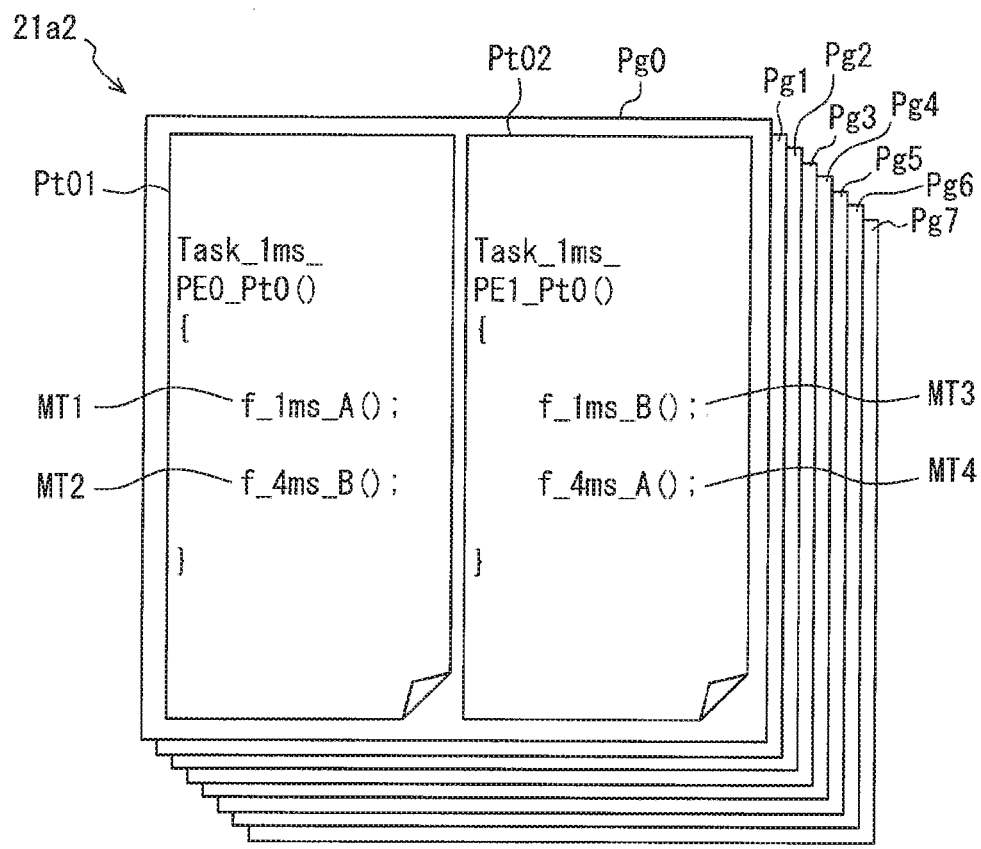
FIG. 6 is a diagram illustrating a source code diagram showing a parallel program for each of the processing patterns according to the embodiment.

FIG. 5 is a drawing illustrating the processing of the computer 10 by functional blocks. The computer 10 includes a pattern extraction unit 10a, a definition unit 10b, an analysis unit 10c, a core allocation unit 10d, a scheduling unit 10e, and a coupling unit 10f.

The pattern extraction unit 10a extracts from the single program the processing patterns Pt0 to Pt7m which are the combinations of the types in the multiple conditions, respectively (extraction unit). The pattern extraction unit 10a extracts from the single program the processing patterns Pt0 to Pt7 which respectively represent the combinations of the execution cycles in the multiple conditions, respectively. In addition, the pattern extraction unit 10a extracts from the single program the processing patterns Pt0 to Pt7 in the count values constituting the multiple conditions, respectively.

In short, the pattern extraction unit 10a extracts the multiple processing patterns Pt0 to Pt7 described above from the single program. The computer 10 executes the automatic parallelizing compiler 1 to extract the processing patterns Pt0 to Pt7 from the single program in this way. Hence, the automatic parallelizing compiler 1 includes an extraction procedure of extracting from the single program the processing patterns which are respectively the combinations of the types in the multiple conditions. For that reason, the pattern extraction unit 10a corresponds to the extraction procedure.

The definition unit 10b defines ranges in which parallelization is performed using the single program and the extracted multiple processing patterns Pt0 to Pt7. Specifically, the definition unit 10b defines the ranges respectively corresponding to the processing patterns Pt0 to Pt7 in source codes of the single program as ranges for performing analysis for parallelization. For example, the definition unit 10b defines eight ranges for performing the analysis for the parallelization. It can be said that the definition unit 10b selects source codes corresponding to the multiple processing patterns Pt0 to Pt7 from the source codes of the single program. For example, the single program and information on the multiple processing patterns Pt0 to Pt7 are inputted to the definition unit 10b.

The analysis unit 10c analyzes the dependency of the single program and extracts the parallelizable processes (generation unit) in such manners that the analysis and extraction is performed separately for each of the range. In other words, the analysis unit 10c analyzes the dependency of the single program and extracts the parallelizable processes, for each of the extracted processing patterns Pt0 to Pt7. For example, the analysis unit 10c extracts the parallelizable processes in the range corresponding to the first processing pattern Pt0, and the analysis unit 10c extracts the parallelizable processes in each of the ranges corresponding to the second processing pattern Pt1 to the eighth processing pattern Pt7. It can be said that the extraction of the parallelizable processes performed in the same manner as that in Patent Literature 1 is performed separately for each of the ranges.

The analysis unit 10c corresponds to a data dependency analysis unit. The analysis unit 10c may analyze a processing time of each process, that is, a time required for execution of each process, separately for each of the ranges.

The core allocation unit 10d allocates the processes to the cores 21c and 21d in such manners that the allocation is performed separately for each of the ranges (generation unit). In other words, the core allocation unit 10d allocates the processes to the cores 21c and 21d, for each of the extracted processing patterns Pt0 to Pt7. It can be said that the allocation of the processes performed in the same manner as that in Patent Literature 1 is performed separately for each of the ranges.

The scheduling unit 10e schedules the processes to thereby rearrange the processes in such manners that the scheduling is performed separately for each of the ranges (generation unit). In other words, the scheduling unit 10e schedules the processes for each of the extracted processing patterns Pt0 to Pt7. For example, the scheduling unit 10e arranges the multiple processes in an execution order of the single program, for each of the range. It can be said that the scheduling performed in the same manner as that in Patent Literature 1 is performed separately for each individual range.

With the above configuration, the computer 10 generates a precoupied program 21a2. As illustrated in FIG. 6, the precoupled program 21a2 includes multiple preprograms Pg0 to Pg7. The preprograms Pg0 to Pg7 represent source codes parallelized for the respective processing patterns Pt0 to Pt7. The preprograms Pg0 to Pg7 represent the parallel programs corresponding to the processing patterns Pt0 to Pt7, respectively. Specifically, the computer 10 generates the preprograms Pg0 to Pg7 so that the number of preprograms Pg0 to Pg7 is equal to the number of processing patterns Pt0 to Pt7.

The first preprogram Pg0 is a source code in which the processes included in the first processing pattern Pt0 are analyzed in the term of dependency, allocated to the respective cores 21c and 21d, and scheduled as described above. The first preprogram Pg0 includes a first source code Pt01 for the first core 21c and a second source code Pt02 for the second core 21d.

Likewise, the second preprogram Pg1 is a source code associated with the processes included in the second processing pattern Pt1. The third preprogram Pg2 is a source code associated with the processes included in the third processing pattern Pt2. The fourth preprogram Pg3 is a source code associated with the processes included in the fourth processing pattern Pt3. The fifth preprogram Pg4 is a source code associated with the processes included in the fifth processing pattern Pt4. The sixth preprogram Pg5 is a source code associated with the processes included in the sixth processing pattern Pt5. The seventh preprogram Pg6 is a source code associated with the processes included in the seventh processing pattern Pt6. The eighth preprogram Pg7 is a source code associated with the processes included in the eighth processing pattern Pt7.

Figure 7:
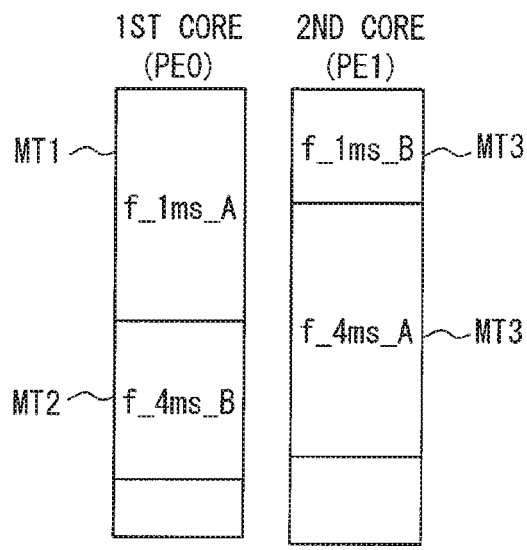
FIG. 7 is a diagram illustrating a parallel program of a first processing pattern according to the embodiment.

For example, the first preprogram Pg0 includes a first process MT1 and a third process MT3 which are processes of 1 ms cycle included in the first processing pattern Pt0. The first preprogram Pg0 further includes a second process MT2 and a fourth process MT4 which are processes of 4 ms cycle included in the first processing pattern Pt0. The first process MT1 to the fourth process MT4 are allocated to the cores 21c and 21d. As illustrated in FIGS. 6 and 7, in the first preprogram Pg0, the first process MT1 and the second process MT2 are allocated to the first core 21c, and the third process MT3 and the fourth process MT4 are allocated to the second core 21d. In this way, the first preprogram Pg0 is scheduled by only the processes to be actually executed. For that reason, when the first preprogram Pg0 is executed by, for example, the multicore processor 21, loads on the first core 21c and the second core 21d for executing the processes can be restrained from being unbalanced. The same is applied to the other preprograms Pg1 to Pg7.

The coupling unit 10f couples the preprograms Pg0 to Pg7 with each other and generates the parallel program 21a1 (generation unit). Specifically, the coupling unit 10f couples the source codes for the first core 21c in the preprograms Pg0 to Pg7 with each other, and couples the source codes for the second core 21d in the preprograms Pg0 to Pg7 with each other. As a result, the coupling unit 10f generates the parallel program 21a1 illustrated in FIG. 8.

The parallel program 21a1 includes a program for the first core 21c and a program for the second core 21d. The program for the first core 21c includes the source codes for the first core 21c in the preprograms Pg0 to Pg7, such as the first source code Pt01. Likewise, the program for the second core 21d includes the source codes for the second core 21d in the preprograms Pg0 to Pg7, such as the second source code Pt02.

Figure 8:
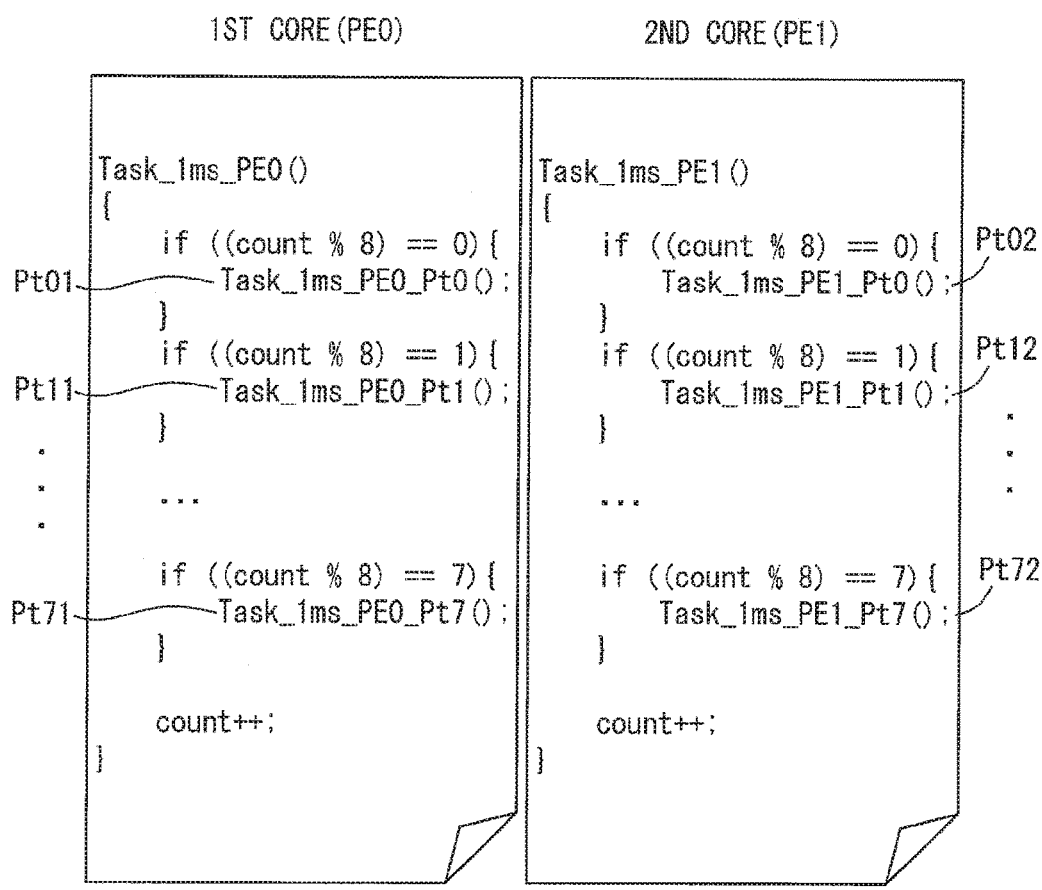
FIG. 8 is a diagram illustrating a source code of the parallel program according to the embodiment.

In FIG. 8, a symbol Pt11 is the source code for the first core 21c in the second preprogram Pg1. A symbol Pt12 is the source code for the second core 21d in the second preprogram Pg1. A symbol Pt71 is the source code for the first core 21c in the eighth preprogram Pg7. A symbol Pt72 is the source code for the second core 21d in the eighth preprogram Pg7.

By executing the automatic parallelizing compiler 1, the computer 10 allocates the multiple processes to the cores 21c and 21d for each of the extracted processing patterns Pt0 to Pt7 and generates the parallel program 21a1. Hence, the automatic parallelizing compiler 1 includes a generation procedure of allocating the multiple processes to the cores 21c and 21d for each of the extracted processing patterns Pt0 to Pt7 to generate the parallel program 21a1. For that reason, the analysis unit 10c, the core allocation unit 10d, the scheduling unit 10e, and the coupling unit 10f correspond to the generation procedure.

Also, the computer 10 executes the automatic parallelizing compiler 1 to couple the preprograms Pg0 to Pg7 with each other. Hence, the automatic parallelizing compiler 1 includes the coupling procedure of coupling the preprograms Pg0 to Pg7 with each other.

As described above, the computer 10d generates the parallel program 21a1 from the single program, wherein the single program includes processes having different execution cycles and a combination of processes to be executed varies according to the count value. From the single program, the computer 10 extracts the processing patterns Pt0 to Pt7, which represent the combinations of the execution cycles in the count values, respectively. As a result, the computer 10 can grasp the processes to be executed in each count value. Further, the computer 10 allocates the processes to the cores 21c and 21d for each of the extracted processing patterns Pt0 to Pt7 and generates the parallel program 21a1. For that reason, processes that are not actually executed under a certain count value during multicore processor 21 execution of the parallel program 21a1 are restrained from being allocated to the cores 21c and 21d. Therefore, the parallelization method can create the parallel program that can suppress a reduction in multicore microcomputer efficiency. Therefore, the computer 10 can create the parallel program 21a1 that can suppress a reduction in the efficiency of the multicore processor 21. Further, the computer 10 can restrain unbalance of the processing loads on the first core 21c and the second core 21d.

Meanwhile, the computer 10 executes the automatic parallelizing compiler 1 to obtain the above advantages. For that reason, the automatic parallelizing compiler 1 can obtain the same advantages.

As described above, the ROM 21a of the vehicle-mounted device 20 stores the parallel program 21a1 generated with the use of the automatic parallelizing compiler 1, Specifically, the parallel program 21a1 generated by the computer 10. The vehicle-mounted device 20 performs the engine control while the first core 21c executes the program for the first core 21c in the parallel program 21a1, and the second core 21d executes the program for the second core 21d in the parallel program 21a1. For that reason, the vehicle-mounted device 20 can suppress the reduction in the efficiency of the multicore processor 21.

The embodiment has been described above. However, the above-described embodiment is illustrative and not limiting. Without departing from the spirit of the present disclosure, there are various modifications, examples of which will be described.

For example, in another embodiment, a worker may execute the extraction procedure and the generation procedure in addition to the parallelization method disclosed in Patent Literature 1, to thereby generate the parallel program 21a1.

The single program may represent a program for the single-core microcomputer configured to acquire multiple sensor values which are detection results of multiple sensors. A combination of types of processes to be executed may vary according to the sensor value. The sensor values may constitute the multiple conditions. For example, the sensor may be a rotation sensor for detecting engine rotation speed, a voltage sensor for detecting a voltage across a battery or the like. The single program may be configured so that the combination of processes differs depending on the sensor value of the rotation sensor or the sensor value of the voltage sensor. As the types, the execution cycles can be employed as in the above embodiment. In that case, from the single program, the computer 10 extracts the processing patterns in the respective sensor values corresponding to the multiple conditions. In these examples also, the computer 10 can obtain the same advantages as those described above. Further, because the automatic parallelizing compiler 1 is executed by the computer 10, the automatic parallelizing compiler 1 can obtain the same advantages as those described above.

What is claimed is:

1. A parallelization method for generating a parallel program parallelized for a multicore microcomputer having a plurality of cores comprising:
providing a single program having a plurality of processes written to be executed by a single-core microcomputer, the plurality of processes of the single program have different types of processes and have a plurality of combinations of the different types of processes based on conditional statements executed in response to a predetermined clock cycle of the single core microcomputer,
extracting, via an extraction procedure, a plurality of processing patterns from the single program based on the conditional statements executed in response to the predetermined clock cycle, wherein the processing patterns, respectively, are the plurality of combinations of the different types of processes; and
allocating, via a generation procedure, for each of the extracted processing patterns, the same kind of processes in the combinations of the different types of processes to the cores to generate the parallel program.

2. The parallelization method according to claim 1, wherein:
the single program includes the processes with different execution cycles as the different types of processes, including
a process of a first execution cycle which is shortest among the multiple execution cycles and
a process of an execution cycle which is an integer multiple of the first execution cycle; and
from the single program, the extraction procedure extracts the processing patterns that are the combinations of the processes with different execution cycles.

3. The parallelization method according to claim 1, wherein:
the single program is a program for the single-core microcomputer configured to acquire a count value;
in the single program, the combinations of the different types of processes are different from each other according to the count value; and
the extraction procedure extracts the processing patterns corresponding to the count values from the single program.

4. The parallelization method according to claim 1, wherein:
the single program includes a program for the single-core microcomputer configured to acquire a plurality of sensor values, which are detection results of a sensor;
the sensor values constitute conditions of the conditional statements; and
in the single program, the combinations of the different types of processes are different from each other varies according to the sensor value; and
the extraction procedure extracts the processing patterns in the respective sensor values from the single program.

5. The parallelization method according to claim 1, wherein
the generation procedure analyses a dependency of the processes and arranges the processes in an execution order of the single program, for each of the extracted processing patterns.

6. A parallelization tool including a computer having a processor and memory for generating
a parallel program parallelized for a multicore microcomputer having a plurality of cores from a plurality of processes in a single program written to be executed by a single-core microcomputer having one core, the plurality of processes of the single program have different types of processes and have a plurality of combinations of the different types of processes based on conditional statements executed in response to a predetermined clock cycle of the single core microcomputer,
the parallelization tool comprising:
an extraction unit that extracts a plurality of processing patterns from the single program based on the conditional statements executed in response to the predetermined clock cycle, wherein the processing patterns, respectively, are the plurality of combinations of the different types of processes; and
a generation unit that, for each of the extracted processing patterns, allocates the same kind of processes in the combinations of different types of processes to the cores to generate the parallel program.

7. The parallelization tool according to claim 6, wherein:

the single program includes the processes with different execution cycles as the different types of processes, including
    a process of a first execution cycle which is shortest among the execution cycles and
    a process of an execution cycle which is an integer multiple of the first execution cycle; and
from the single program, the extraction unit extracts the processing patterns that are the combinations of the processes with different execution cycles.

8. The parallelization tool according to claim 6, wherein:
the single program includes a program for the single-core microcomputer configured to acquire a count value;
in the single program, the combinations of the different types of processes are different from each other according to the count value; and
the extraction unit extracts the processing patterns corresponding to the count values from the single program.

9. The parallelization tool according to claim 6, wherein:
the single program includes a program for the single-core microcomputer configured to acquire a plurality of sensor values that are detection results of a sensor;
in the single program, the combinations of the different types of processes are different from each other varies according to the sensor value; and
the extraction unit extracts the processing patterns in the respective sensor values constituting conditions of the conditional statements from the single program.

10. The parallelization tool according to claim 6, wherein:
the generation unit analyses a dependency of the processes and arranges the processes in an execution order of the single program, for each of the processing patterns.

11. A vehicle-mounted device comprising:
a multicore microcomputer having a plurality of cores; and
a parallel program parallelized for the multicore microcomputer from a plurality of processes in a single program written to be executed by a single-core microcomputer having one core, the plurality of processes of the single program have different types of processes and have a plurality of combinations of the different types of processes based on conditional statements executed in response to a predetermined clock cycle of the single core microcomputer, wherein:
the parallel program is generated such that a plurality of processing patterns, which respectively are the plurality of combinations of the different types of processes, are extracted from the single program based on the conditional statements executed in response to the predetermined clock cycle, and the processes are allocated to the cores for each of the extracted processing patterns; and
the cores execute the same kind of processes in the combinations of the different types of processes allocated to each of the cores, respectively.

12. The vehicle-mounted device according to claim 11, wherein:
the single program includes the processes with different execution cycles as the different types of processes, including
    a process of a first execution cycle which is shortest among the execution cycles and
    a process of an execution cycle which is an integer multiple of the first execution cycle; and
in the parallel program, the processing patterns that are the combinations of the processes with different execution cycles are extracted from the single program.

13. The vehicle-mounted device according to claim 11, wherein:
the single program includes a program for the single-core microcomputer configured to acquire a count value;
in the single program, the combinations of the different types of processes are different from each other according to the count value; and
in the parallel program, the processing patterns corresponding to the count values are extracted from the single program.

14. The vehicle-mounted device according to claim 11, wherein:
the single program includes a program for the single-core microcomputer configured to acquire a plurality of sensor values which are detection results of a sensor;
in the single program, the combinations of the different types of processes are different from each other varies according to the sensor value; and
in the parallel program, the processing patterns in the respective sensor values constituting conditions of the conditional statements are extracted from the single program.

15. The vehicle-mounted device according to claim 11, wherein
in the parallel program, based on analysis of a dependency of the processes, the processes are arranged in an execution order of the single program for each of the extracted processing patterns.

\* \* \* \* \*